United States Patent
Hunger et al.

(10) Patent No.: US 11,434,899 B2
(45) Date of Patent: Sep. 6, 2022

(54) METHOD OF TESTING A UNIT PUMP SYSTEM PERFORMANCE

(71) Applicant: Robert Bosch Limitada, Campinas (BR)

(72) Inventors: Bruno Hunger, Campinas (BR); Anderson Gonsalves, Campinas (BR); Avelino Souza, Campinas (BR); Eduardo Lemos, Campinas (BR); João Bueno, Curitiba (BR); André Horn, Curitiba (BR)

(73) Assignee: ROBERT BOSCH LIMITADA, Campinas Sp (BR)

( * ) Notice: Subject to any disclaimer, the term of this patent is extended or adjusted under 35 U.S.C. 154(b) by 637 days.

(21) Appl. No.: 16/446,375

(22) Filed: Jun. 19, 2019

(65) Prior Publication Data

US 2019/0390666 A1    Dec. 26, 2019

Related U.S. Application Data

(60) Provisional application No. 62/688,129, filed on Jun. 21, 2018.

(51) Int. Cl.
| | |
|---|---|
| *F02M 65/00* | (2006.01) |
| *F04B 51/00* | (2006.01) |
| *F04B 7/00* | (2006.01) |
| *F04B 15/00* | (2006.01) |
| *F02M 59/46* | (2006.01) |

(52) U.S. Cl.
CPC ............. *F04B 51/00* (2013.01); *F02M 65/00* (2013.01); *F04B 7/0076* (2013.01); *F04B 15/00* (2013.01); *F02M 59/466* (2013.01); *F04B 2201/06* (2013.01); *F04B 2205/00* (2013.01)

(58) Field of Classification Search
CPC ........ F04B 51/00; F04B 7/0076; F04B 15/00; F04B 2201/06; F04B 2205/00; F04B 2205/09; F04B 2205/11; F02M 65/00; F02M 59/466; F02M 57/023; (Continued)

(56) References Cited

U.S. PATENT DOCUMENTS

| | | | |
|---|---|---|---|
| 6,234,002 B1 * | 5/2001 | Sisney | F02M 65/001 73/116.04 |
| 7,089,789 B2 * | 8/2006 | Klopfer | F02M 59/102 239/533.1 |

(Continued)

FOREIGN PATENT DOCUMENTS

| | | |
|---|---|---|
| DE | 10309609 A1 | 9/2003 |
| DE | 102010031481 A1 | 1/2012 |

(Continued)

OTHER PUBLICATIONS

International Search Report and Written Opinion for Application No. PCT/BR2019/050231 dated Sep. 18, 2019 (10 pages).

*Primary Examiner* — Freddie Kirkland, III
(74) *Attorney, Agent, or Firm* — Michael Best & Friedrich LLP

(57) ABSTRACT

A method of testing a unit pump system performance is disclosed. In one embodiment of the present disclosure, the method of testing a unit pump system performance determines if mechanical and/or electrical stability of a control valve of the unit pump system are achieved before measuring an output injection volume variation.

6 Claims, 11 Drawing Sheets

(58) Field of Classification Search
CPC ... G01M 15/02; G01M 15/04; F02D 41/2432; F02D 41/2464
See application file for complete search history.

(56) References Cited

U.S. PATENT DOCUMENTS

| | | |
|---|---|---|
| 9,528,768 B2 | 12/2016 | Schoenfeld et al. |
| 2005/0150271 A1* | 7/2005 | Klopfer .................. F02M 59/26 73/1.36 |
| 2013/0186605 A1* | 7/2013 | Schoenfeld .......... F02M 65/001 165/157 |

FOREIGN PATENT DOCUMENTS

| | | |
|---|---|---|
| WO | 03081014 A2 | 10/2003 |
| WO | 2016189546 A1 | 12/2016 |

* cited by examiner

METHOD OF TESTING A UNIT PUMP SYSTEM PERFORMANCE

BACKGROUND OF THE INVENTION

The present disclosure relates to systems and methods of testing unit pump systems performances. Particularly, the present disclosure relates to a method of testing a diesel unit pump system performance in terms of its injection volume deviation rate.

With increasingly stringent emission requirements, the search for more efficient combustion engines becomes frequently important. One important aspect of producing components for combustion engines is to understand the behavior of each component of the engine and its performance. For that, tests are conducted to determine the component's performance and efficiency.

One of the systems that has the greatest impact on the engine's performance is the injection system also known as unit pump system. Unit pump systems are high-pressure injection systems used for fuel injection, more specifically, for diesel injection, in commercial vehicles and large engines. These systems are designed to receive fuel supplied by a fuel supply system and inject fuel into an engine combustion chamber.

Unit pump systems are configured to control the injection, including the moment and duration of injection and the quantity of fuel to be injected. Such characteristics can help optimize fuel combustion, avoiding incomplete combustion and, consequently, reducing the percentage of harmful gases in the exhaust emissions.

In order to optimize fuel combustion, unit pump systems are frequently tested in view of their injection volume variation to make sure that the pumps being produced will satisfy the emission requirements. This quality gate determines whether the produced components can provide the desired outcome and avoid legal problems.

Therefore, it is of great importance that the methods of testing unit pump systems provide reliable results and reflect real use situations so that the components are configured as efficiently as possible and behave as expected. However, test methods known in the art do not mitigate conditions that may have considerable impacts in the measurements of the tests, such as environmental conditions.

The mechanical components' performance of unit pump systems under test can be affected, for example, by the environment temperature. The environment temperature can also affect electrical components of unit pump systems, like a control valve. Such effects, as well as others that may influence the measured outcome, have not been considered by known test procedures, which usually wait for a certain period before starting taking measurements in an attempt to mitigate these effects. Consequently, higher injection deviations can be observed, as the components perform differently under different environmental conditions, leading to a higher measurement spread. As a result, higher measurement spreads affect the capability of achieving stronger emission legislations.

SUMMARY OF THE INVENTION

As described above, the known methods of testing a unit pump system performance have not proven to be fully satisfactory in mitigating external influences that may lead to higher injection volume variation measurements. Even though methods of testing a unit pump systems known in the art take some actions as an attempt to mitigate external influences, like waiting a certain period before measuring the volume of fuel injected, the output values measured when applying such procedures provide results outside the tolerated spread limits for injection deviation.

Therefore, it is an object of the present disclosure to provide a method of testing a unit pump system performance that mitigates the environmental effects on the measurement process. It is another object of the present disclosure to provide a method of testing a unit pump system performance that provide results within the tolerated spread limits for injection deviation. It is a further object of the present disclosure to provide a method of testing a unit pump system performance that observes the mechanical and electrical stability of the components being measured. It is yet another object of the present disclosure to provide a method of testing a unit pump system performance that evaluates the product performance with better precision.

In one embodiment, the present disclosure achieves these and other objectives by providing a method of testing a unit pump system performance comprising the steps of: setting up and initializing a test bench; determining if a mechanical stability of a control valve of the unit pump system is achieved; and measuring an injection quantity if the mechanical stability of the control valve of the unit pump system is achieved. The step of determining if the mechanical stability of the control valve of the unit pump system is achieved might comprise measuring a fuel temperature of the unit pump system. The step of determining if the mechanical stability of the control valve of the unit pump system is achieved might further comprise comparing the fuel temperature of the unit pump system to a target value of temperature for mechanical stability. The mechanical stability of the control valve of the unit pump system might be achieved when the fuel temperature of the unit pump system matches the target value of temperature for mechanical stability. The step of determining if the mechanical stability of the control valve of the unit pump system is achieved might continue to be performed if the mechanical stability is not achieved.

In another embodiment, the present disclosure achieves these and other objectives by providing a method of testing a unit pump system performance comprising the steps of: setting up and initializing a test bench; determining if an electrical stability of the control valve of the unit pump system is achieved; and measuring an injection quantity if the electrical stability of the control valve of the unit pump system is achieved. The step of determining if the electrical stability of the control valve of the unit pump system is achieved might comprise measuring an electric current profile of the control valve. The electric current profile might be measured by measuring a solenoid resistance of the control valve of the unit pump system. The step of measuring the electric current profile of the control valve might comprise determining a moment in time a first predetermined electric current value is measured, determining a moment in time a second predetermined electric current value is measured and calculating a time difference between the moments the two predetermined electric current values are measured. The electrical stability of the control valve of the unit pump system might be achieved when the time difference between the determined moments of the two predetermined electric current values is lower than a threshold value of time for electrical stability. The step of determining if the electrical stability of the control valve of the unit pump system is achieved might continue to be performed if the electrical stability is not achieved.

BRIEF DESCRIPTION OF THE DRAWINGS

FIG. 5 is a table showing fuel temperatures and injection volume outputs for different pumps with different initial temperatures of an example of the method of testing a unit pump system performance of the present disclosure.

FIG. 19 is a table of an example of injection volume variation output of the method of testing a unit pump system performance of the present disclosure.

DETAILED DESCRIPTION

Figure 1:
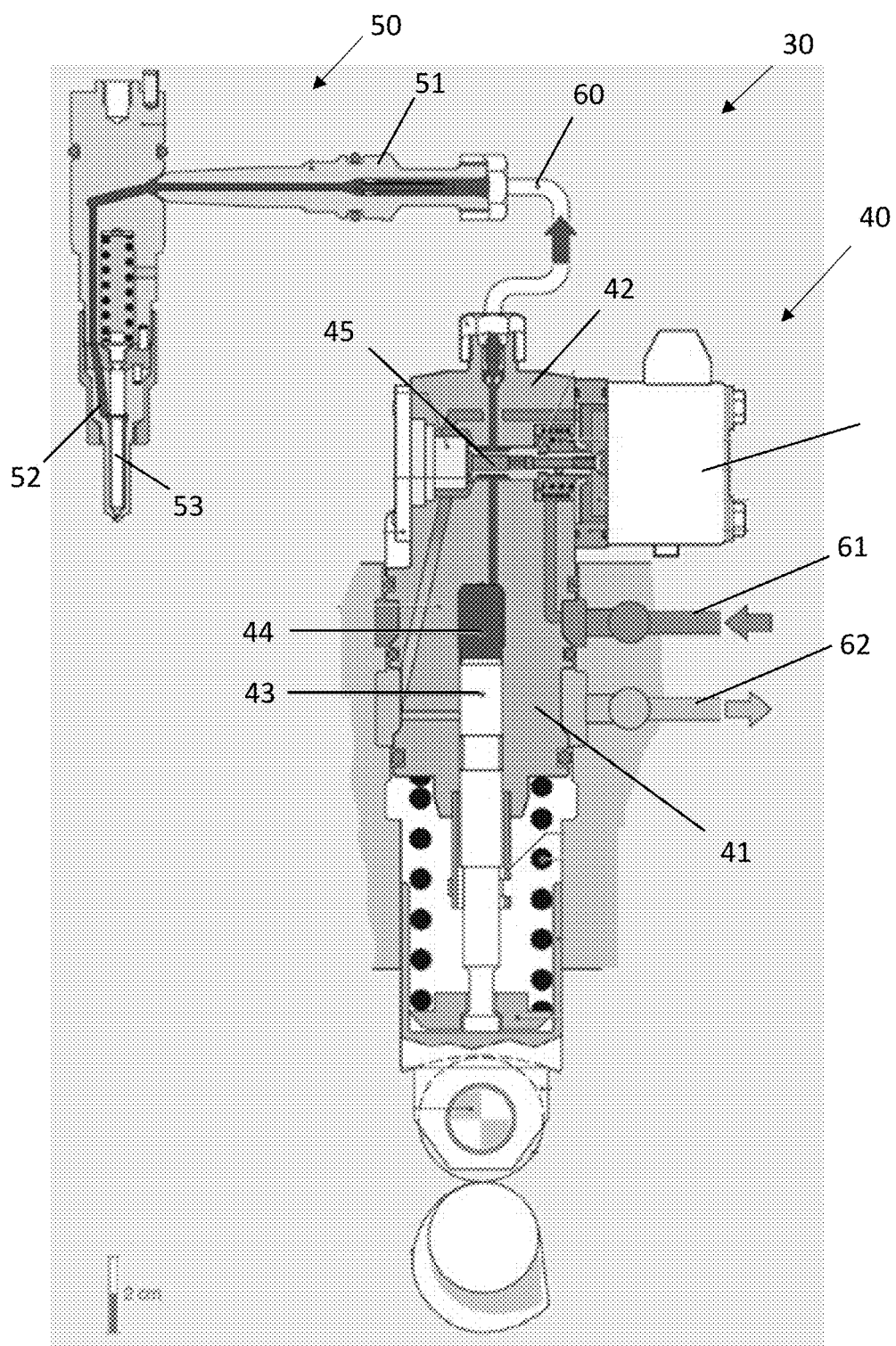
FIG. 1 is an illustration of a unit pump system.

Differently from the popular unit injector systems, unit pump systems are modular, which means that the main components of the system are separated. FIG. 1 illustrates an example of unit pump system 30 consisting of an injector 40 and a nozzle 50 connected to each other by a high-pressure line 60.

The injector 40 is usually secured to the side of an engine block (not illustrated) and comprises a unit pump 41 and a control valve 42. The unit pump 41 receives fuel from a fuel supply 61 line from a vehicle fuel system and pressurizes the supplied fuel by moving a plunger 43 inside a high-pressure chamber 44. The control valve 42 controls the passage of fuel from the fuel supply line 61 to the high-pressure chamber 44 and from the high-pressure chamber 44 to the high-pressure line 60.

The control valve 42, also known as solenoid valve, is an electromechanical device comprising a coil and a magnet core (not illustrated), which uses electric current to generate a magnetic field. Such magnetic field is used to operate a needle 45 that regulates the passage of fuel inside the unit pump 30 and the fuel quantity that will be delivered to the high-pressure line 60 and, subsequently, to the nozzle 50. Therefore, the operation of the control valve 42 is of great importance to the efficiency of the fuel combustion because it controls the fuel injection pressure.

The fuel supplied by the fuel supply line 61 and flowing inside the injector 40 is essentially delivered to the high-pressure line 60 when injection is desired but can also return to the vehicle fuel system through a fuel return line 62 when the injection is not occurring. When the plunger 43 is reducing the high-pressure chamber 44 volume before the fuel injection but the control valve 42 is still open, the fuel may flow back from the unit pump 30 to the fuel return line 62. Fuel may also flow back from the unit pump 30 to the fuel return line 62 after the required quantity of fuel is injected.

The nozzle 50 of a unit pump system is usually installed in a cylinder head (not illustrated) and is responsible for delivering fuel to an engine combustion chamber. The fuel is supplied by the high-pressure line 60 through a pressure fitting 51, passes through an injection chamber 52 inside the nozzle 50 and is injected in the engine combustion chamber when a nozzle-needle 53 is opened.

The fuel supplied to the injection chamber 52 by the high-pressure line 60 is pressurized in the high-pressure chamber 44 and can be pressurized to as high as 2200 bar. The injection duration in an engine may vary from 1 millisecond to 2 milliseconds (ms). The injected fuel quantities in an engine may vary between 1 $mm^3$ and 50 $mm^3$, and between 3 $mm^3$ and 350 $mm^3$ on a commercial vehicle. These quantities have to pass through an opening of less than 0.25 $mm^2$ during 1 or 2 ms of injection duration.

Such dimensional values show the importance of considering the environment influence when performing injection variation measurements during tests in unit pump systems. For example, minor variations in the engine component's temperature can result in significant and undesired injection volume variations. The method of the present disclosure recognizes the impact of these effects on the product performance and performs the test under mechanical and electrical stability in order to evaluate the product performance with better precision.

Figure 2:
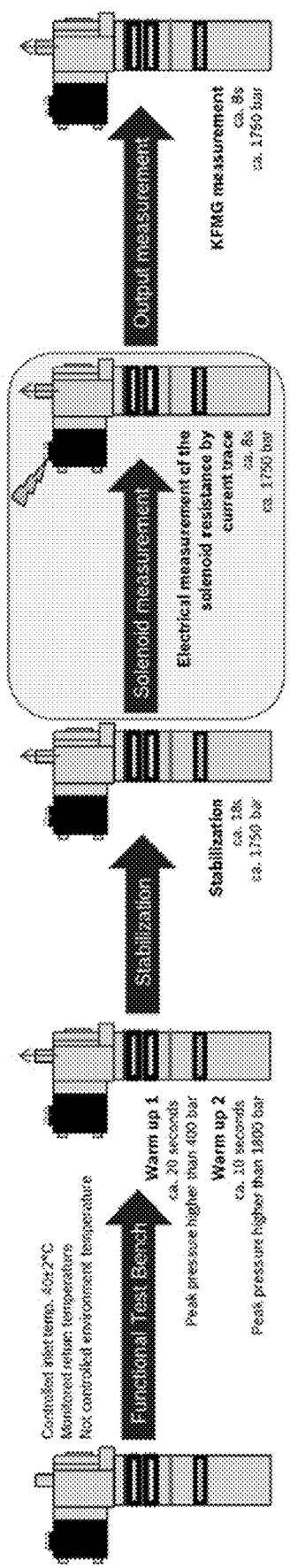
FIG. 2 is a flow-chart of one embodiment of the method of testing a unit pump system performance of the present disclosure.
Figure 3:
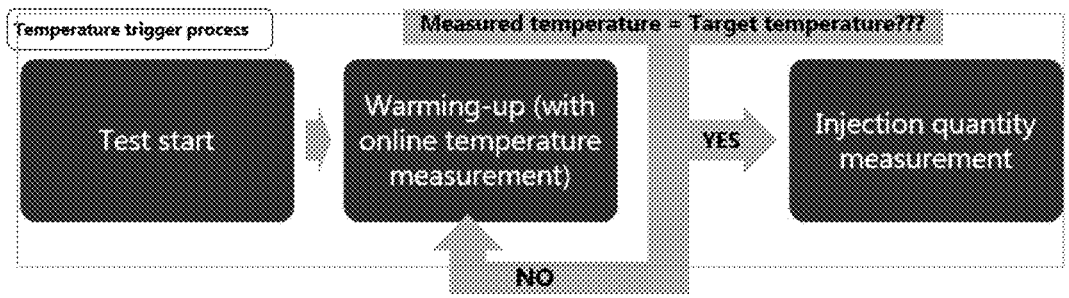
FIG. 3 is a flow-chart of one embodiment of the method of testing a unit pump system performance of the present disclosure.

FIGS. 2 and 3 show examples of embodiment of the present disclosure. In such examples, the method of the present disclosure starts with a test bench initialization. The test bench is responsible for performing engine tests. Setting it up for a unit pump system performance test allows users to perform measurements related to different aspects of the engine, including a pump injection volume variation measurement.

After setting up and initializing a test bench, stabilizing the system is desired in order to guarantee that the results of the tests will not be affected by undesired variations. Such system stability may comprise mechanical stability and/or electrical stability.

One example of a condition that may affect an output measurement of the test is temperature variation. Some products are produced in locations that present significant temperature variations during the day and from one day to another, resulting in significant effects on the mechanical stability of test methods of some components of the unit pump system.

Achieving the mechanical stability of the control valve of the unit pump system during the test is important to improve its performance in terms of injection volume deviation rate. The injection volume deviation rate usually has a tolerance of 3 mm$^3$ of spread, which is considered an acceptable deviation value for a performance test. It is important to note that such tolerance may vary.

One way of determining if the mechanical stability of the control valve has been achieved is to measure a fuel temperature of the unit pump system. One example of measurement may be performed by measuring the fuel flow back temperature of the unit pump system, which is the temperature of the fuel that flows from the unit pump back to the fuel return line.

In order to determine if the mechanical stability of the control valve of the unit pump system has been achieved, the fuel temperature of the unit pump system must match a predetermined target value of temperature for mechanical stability.

Figure 4:
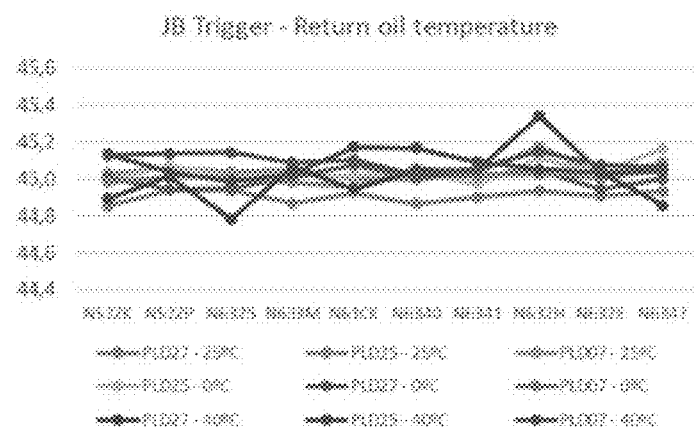
FIG. 4 is a graph of fuel temperatures for different pumps with different initial temperatures of an example of the method of testing a unit pump system performance of the present disclosure.
Figure 5:
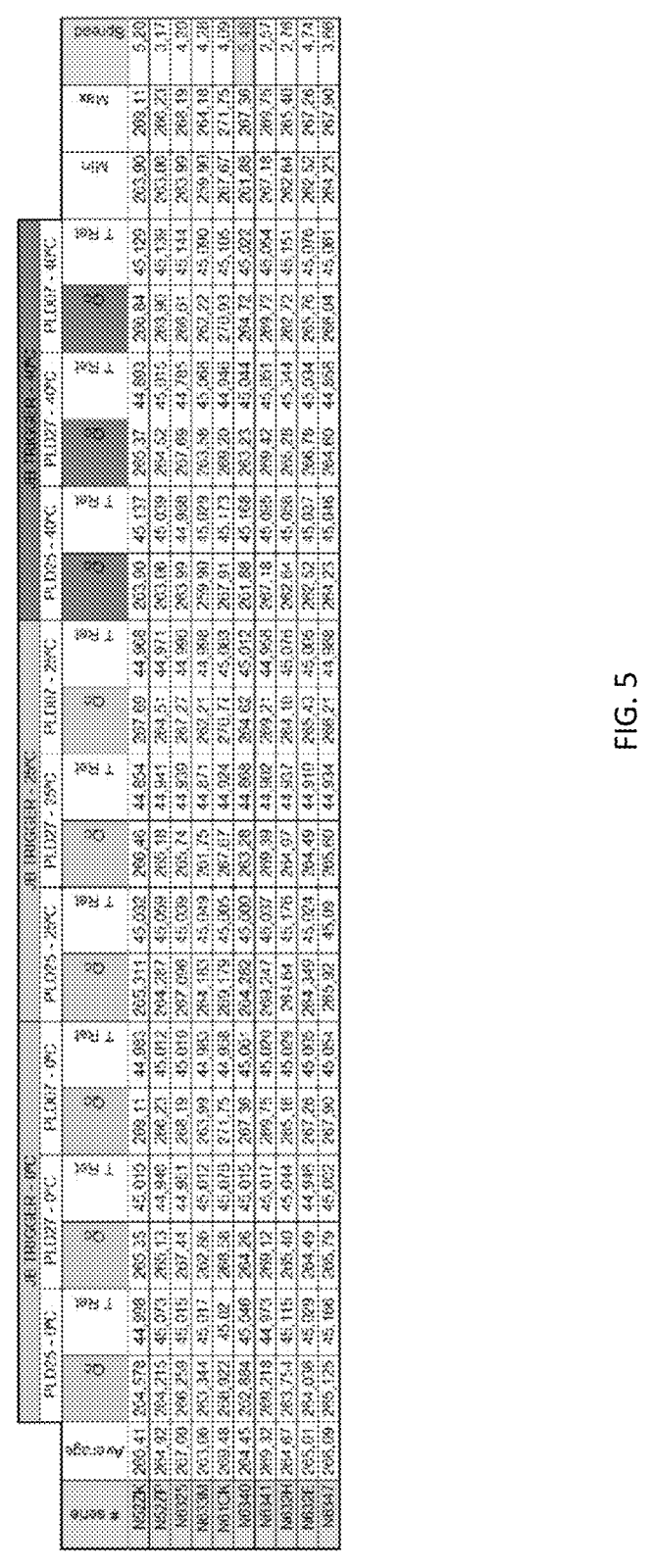

As can be seen from FIGS. 4 to 7, initial pump temperatures and unit pump system types may influence the injection volume variation measurement. FIGS. 4 to 7 illustrate examples of how the output measurements are made and how these measurements help to determine if such injection variations are within the acceptable spread values. FIG. 4 illustrates measurements of the fuel temperature made for ten different pumps with three different test benches and three different temperatures. The obtained values are shown in FIG. 5. FIG. 5 illustrates a table with an injection volume output (Qc) in mm$^3$/stk (mm$^3$/stroke) and the fuel temperature (TRet) for each test condition (triggers, test benches and initial pump temperatures). It also illustrates an average output value in mm$^3$/stk, a minimum and a maximum output value in mm$^3$/stk and a spread value, which is a difference between the maximum and the minimum output value.

Figure 6:
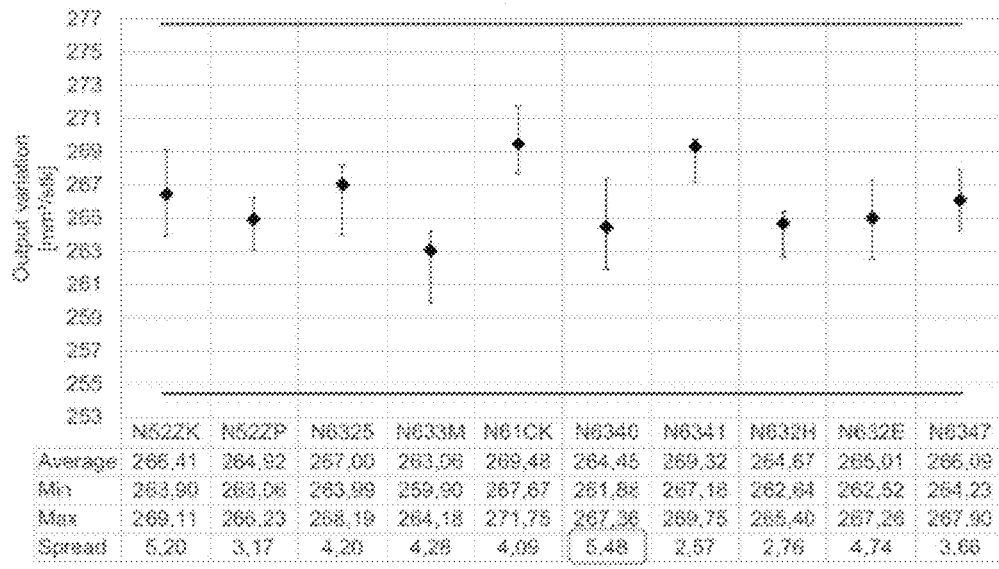
FIG. 6 is a graph of injection volume output variations for different pumps of an example of the method of testing a unit pump system performance of the present disclosure.

FIG. 6 illustrates a graph of the influence of different initial pumps temperatures on the injection volume in mm$^3$/stk using the fuel temperature as trigger, or, in other words, using a control valve that achieved mechanical stability. The relevant information is presented below the graph, including pump type, average injection volume output variation, minimum output variation, maximum output variation and spread value. As can be seen in the example of FIG. 6, achieving mechanical stability of the control valve may result, in some cases, in output variations within the acceptable spread value and, in others, outside the acceptable spread value.

Figure 7:
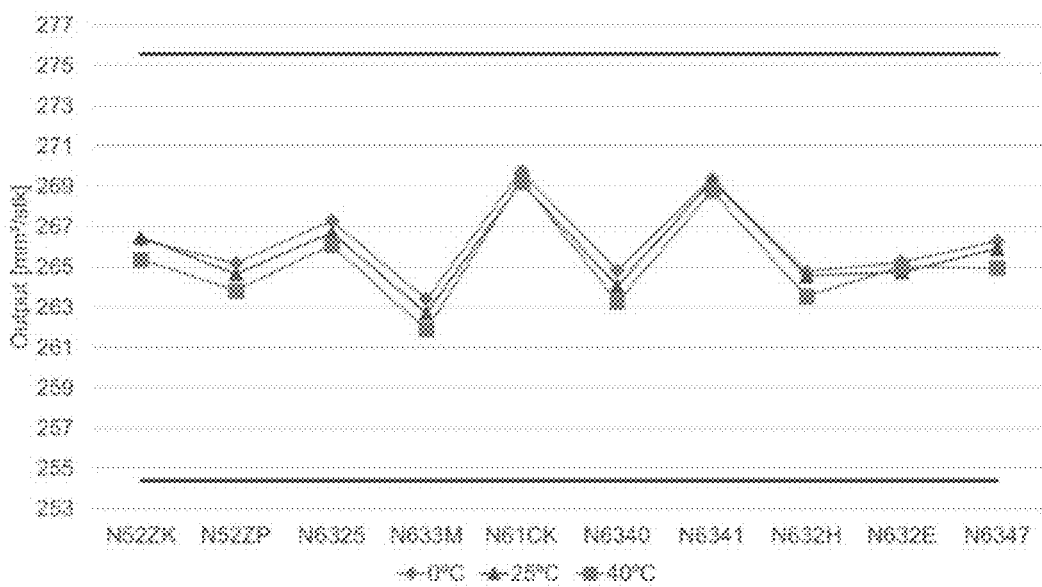
FIG. 7 is a graph of injection volume output measurements for different pumps of an example of the method of testing a unit pump system performance of the present disclosure.

FIG. 7 illustrates a graph of the influence of different initial pumps temperatures on the injection volume output in mm$^3$/stk using a trigger by temperature. As can be seen, different pumps are affected differently by temperature variations even when mechanical stability has already been achieved.

Therefore, the electrical stability is another important aspect to improve the control valve performance in terms of injection volume deviation rate. Several factors may influence the electrical stability of the control valve. For example, if a stator of the control valve has a material that is different from a pump body material, the thermal stability of electric components may be achieved at a different moment from the mechanical stability. The thermal stability of electric components may affect the solenoid resistance and, consequently, the electrical stability of the unit pump system. In addition, the current applied to the control valve coil may also influence the thermal stability, affecting the electrical stability of the control valve.

Figure 8:
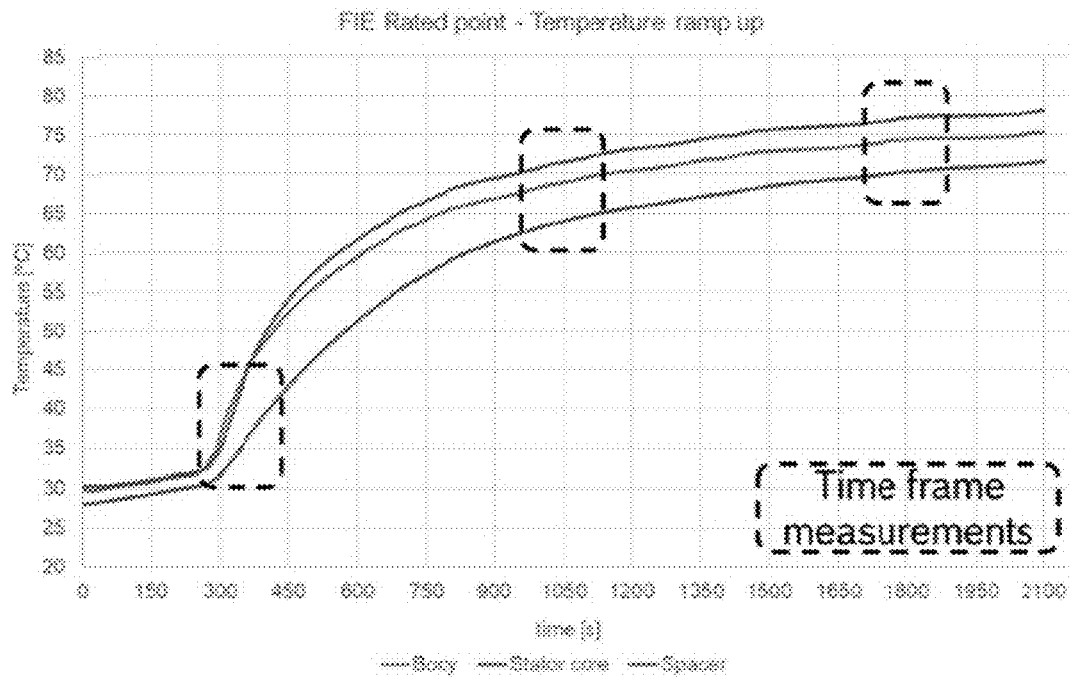
FIG. 8 is a graph of temperature variation of components of the unit pump system of the present disclosure over time of an example of the method of testing a unit pump system performance.
Figure 9:
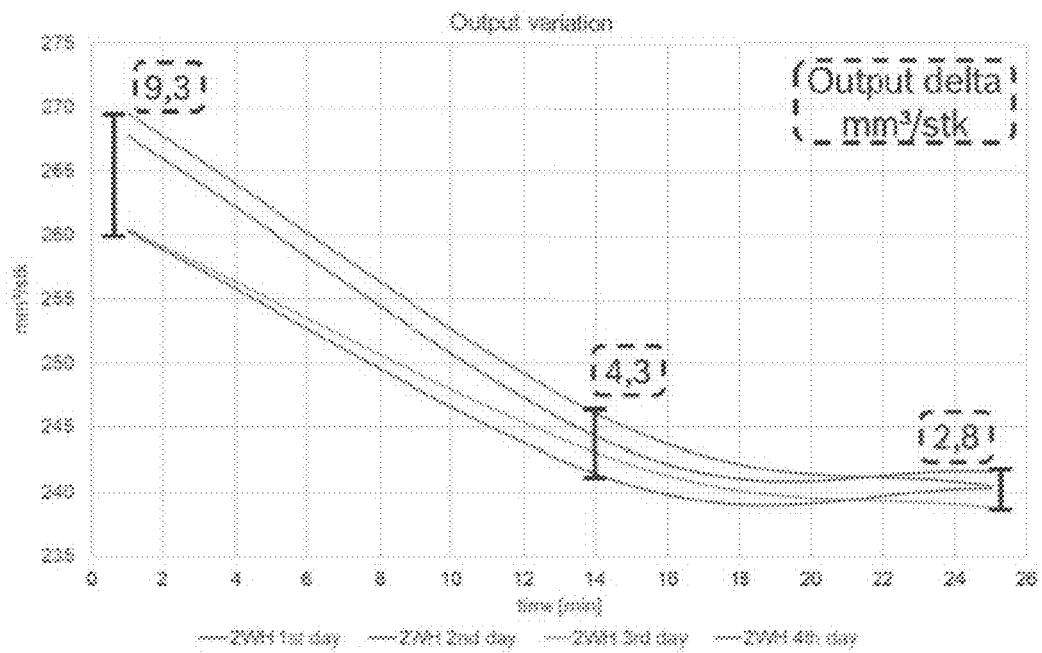
FIG. 9 is a graph of injection volume output measurements for different components' temperatures in different days of an example of the method of testing a unit pump system performance of the present disclosure.

FIGS. 8 and 9 illustrate the injection volume output in mm$^3$/stk for different fuel injection components' calorie exchange rate. FIG. 8 illustrates the temperature of three different components of the unit pump system over time, body, stator core and spacer. Three different moments with different calorie exchange rates are highlighted to demonstrate the calorie exchange rate influence in injection volume stability. The injection volumes measured in each of these moments are shown in FIG. 9. The same time frames were measured in different days and compared in order to obtain the injection volume stability. As the magnetic force changed, the injection volume output was affected. As it can be noticed, a better stability of injection volume output is obtained when the pump (stator) is in a lower rate of calorie exchange.

Figure 10:
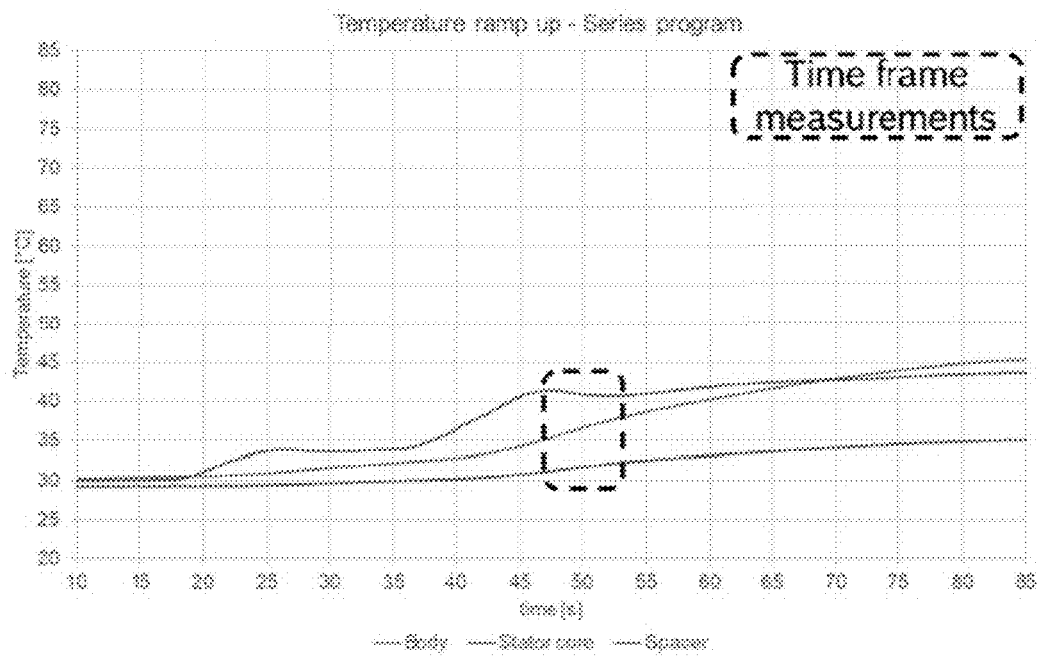
FIG. 10 is a graph of temperature variation of components of the unit pump system of the present disclosure over time of an example of the method of testing a unit pump system performance.
Figure 11:
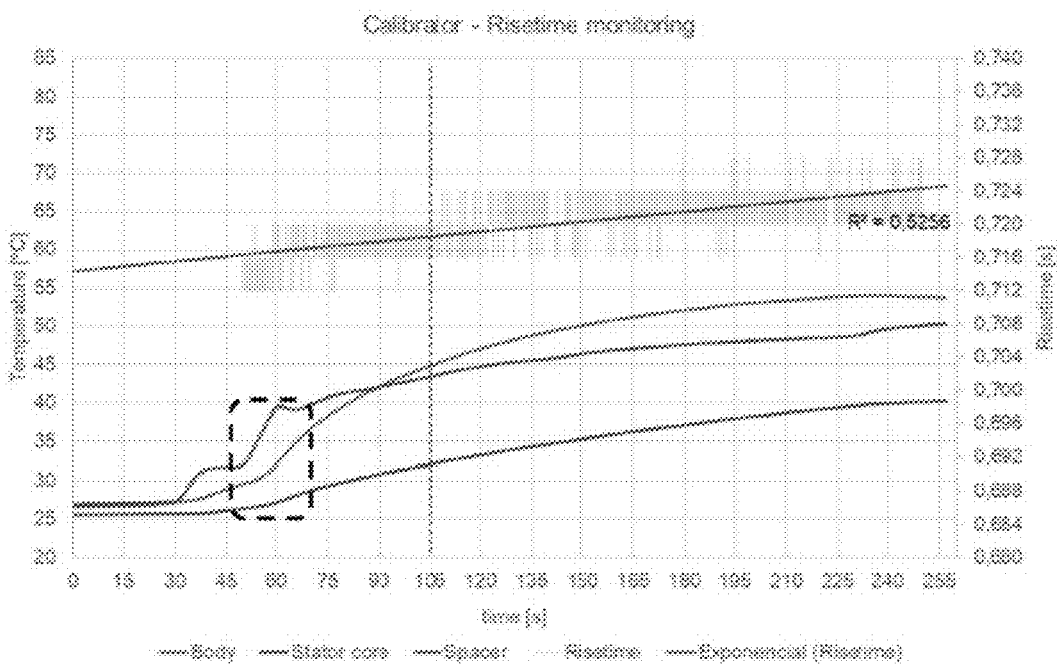
FIG. 11 is a graph of risetime monitoring compared to temperature variation of components of the unit pump system of the present disclosure over time of an example of the method of testing a unit pump system performance.

FIG. 10 illustrates a pump components' temperature increase over time, which causes a change in the magnetic force and affects the injection volume output. FIG. 11 illustrates a risetime monitoring in seconds along a test to show the effect of such temperature increase. The mechanical response of the hydraulic valve is affected by the temperature variation during the pump warm up.

Figure 12:
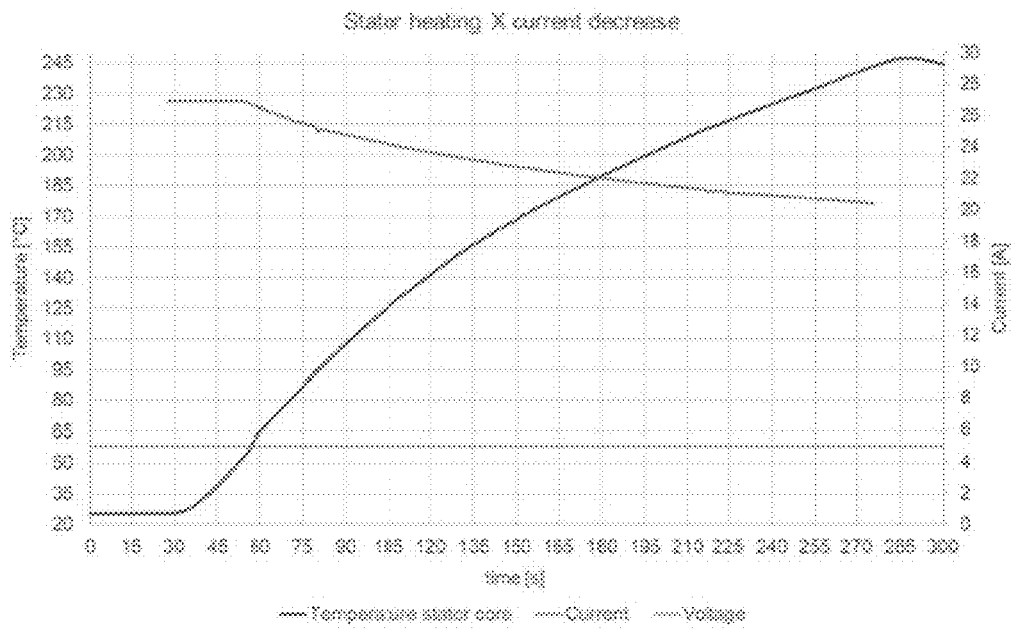
FIG. 12 is a graph of the temperature influence over the electrical behavior of a stator of a unit pump system of the present disclosure.
Figure 13:
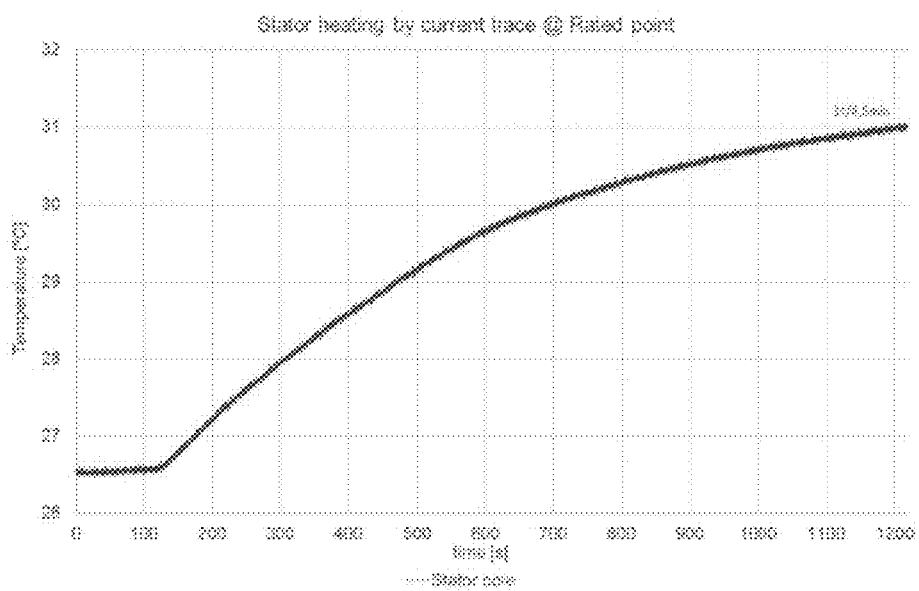
FIG. 13 is a graph of the temperature variation of a stator by current trace of a unit pump system of the present disclosure.

FIG. 12 illustrates the temperature influence over the electrical behavior of the stator. As the stator core temperature rises, the electrical resistance in the control valve increases, affecting the current. However, the calorie contribution from the current trace of an engine control unit of the unit pump system is minimal. The fuel contact with the stator has a major part in its heating, as can be seen when FIG. 12 is compared with FIG. 13, which illustrates the stator heating by current trace. Such behavior allows a temperature control using the electrical resistance.

Figure 14:
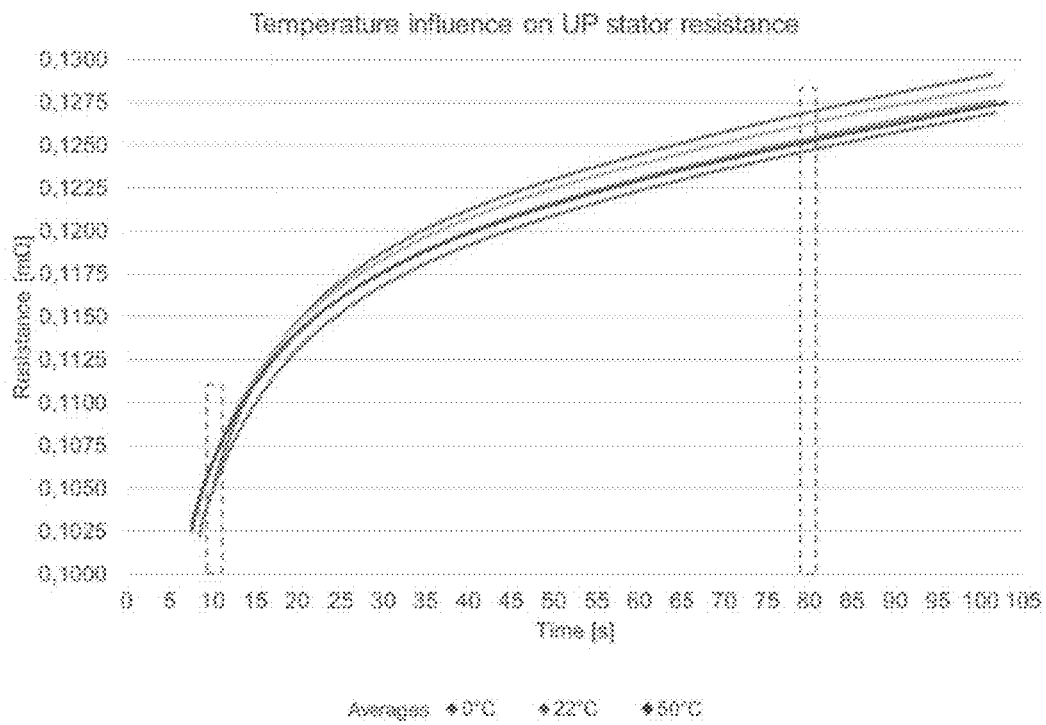
FIG. 14 is a graph of the temperature influence on a stator resistance of a control valve of a unit pump system of the present disclosure.
Figure 15:
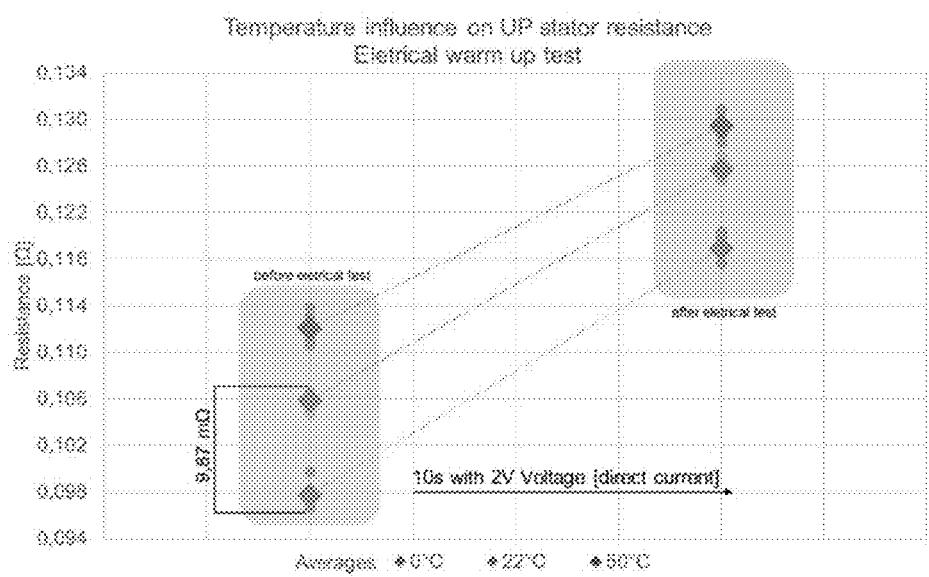
FIG. 15 is a graph of the temperature influence on a stator resistance of a control valve of a unit pump system of the present disclosure highlighting moments before and after a warm up test.

FIG. 14 illustrates the temperature influence on the unit pump system stator resistance over time. The stator resistance is shown in micro-ohm (mΩ) and the time in seconds (s). The marked areas define two moments when the stator resistance values were measured (before and after an electrical warm up test). These values were extracted and plotted in FIG. 15 to facilitate the visualization of such influence. From FIGS. 14 and 15, it is possible to notice that the electrical warm up test help to achieve a reduced stator resistance spread. It is important to notice that for the electrical warm up test, difference of the stators must be respected in order to avoid its natural construction characteristics.

The method of testing of the present disclosure introduces a step of achieving electrical stability before carrying out the injection deviation measurements. In order to determine the achievement of electrical stability of the control valve, a solenoid measurement is performed. The solenoid measurement is an electrical measurement of the solenoid resistance. Such measurement provides an electric current profile of the control valve.

Figure 16:
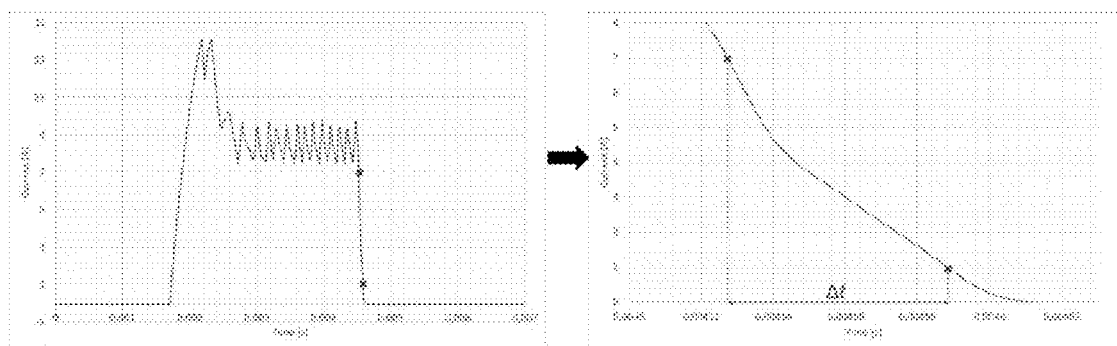
FIG. 16 is a graph of an example of electric current profile measurement of the method of testing a unit pump system performance of the present disclosure.

FIG. 16 shows an example of current profile of a control valve. The left side presents one cycle of the current profile and the right side presents a zoom of the last part of the cycle, also known as current shut down period. The current profile of the control valve help to determine if the electrical stability was achieved. The control valve is considered to be electrically stable if a time difference between two predetermined electric current values ($\Delta t$) is lower than a threshold value of time for electrical stability. First, two electric current values are determined. Then, when a first predetermined electric current value is measured, the moment of measurement of such first predetermined electric current value is determined. The same process is performed for a second predetermined electric current value. After determining the moment of the first and second predetermined electric current values, a time difference ($\Delta t$) between the moments is calculated. Such time difference is compared to the threshold value of time for electrical stability to determine if the electrical stability has been achieved. If the measured time difference is lower than the threshold value of time for electrical stability, the electrical stability has been achieved. Otherwise, electrical stability has not yet been achieved.

To determine the electrical behavior of the unit pump system, the following equation can be used:

$$L = \frac{N\Phi}{i}$$

Wherein "N" is the number of coil turns; $\Phi$ is the magnetic flux; and "i" is the current of the system.

The magnetic flux is calculated from the following equation:

$$\Phi = \frac{N \cdot i}{R}$$

Wherein "N" is the number of coil turns; "i" is the current; and "R" is the resistance.

The current is calculated from the following equation:

$$i = \frac{U}{R}$$

Wherein "U" is the voltage; and "R" is the resistance.

The resistance can be obtained from:

$$R = R_0[1 + a(t - t_0)]$$

Wherein $R_0$ is the resistance at 22° C. [91.1±9.2]m$\Omega$; "a" is the material coefficient; "$t_0$" is the initial time; and "t" is the time of measurement.

The magnetic force is obtained from:

$$Fmag = \frac{(\Phi)^2}{2A\mu_o\mu_R}$$

Wherein "A" is the core area on the armature; "$\Phi$" is the magnetic flux; "$\mu_o$" is the vacuum permeability; and "$\mu_o$" is the material permeability.

The injection volume variation is only measured after the mechanical and the electrical stability is achieved in order to provide more stabilized results. Such stabilized results are achieved when the system is stable or, in other words, when the measurements are made at the same target value of temperature for mechanical stability and/or at the same threshold value of time for electrical stability. Consequently, the required performance to legal emission standards can be achieved.

Figure 17:
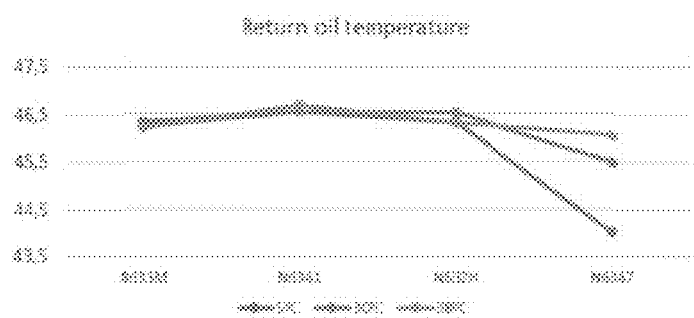
FIG. 17 is a graph of an example of fuel temperature measurements of the method of testing a unit pump system performance of the present disclosure.
Figure 18:
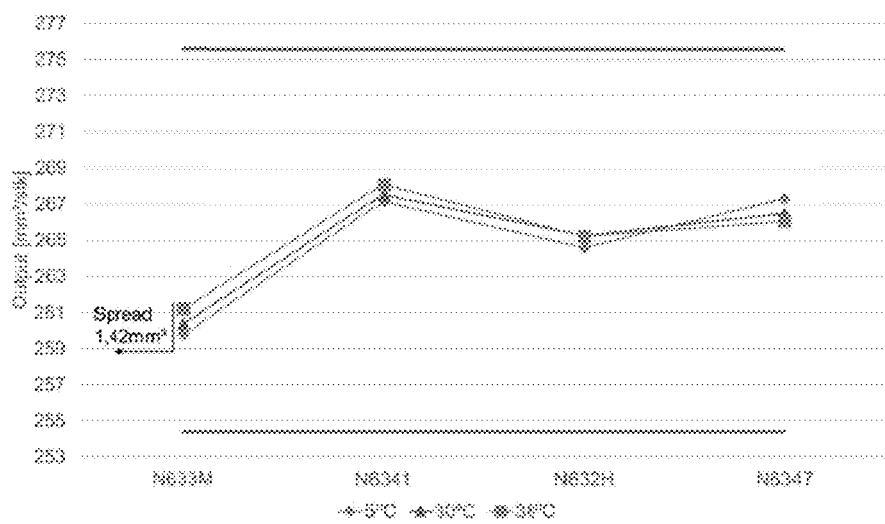
FIG. 18 is a graph of an example of injection volume variation output of the method of testing a unit pump system performance of the present disclosure.
Figure 19:
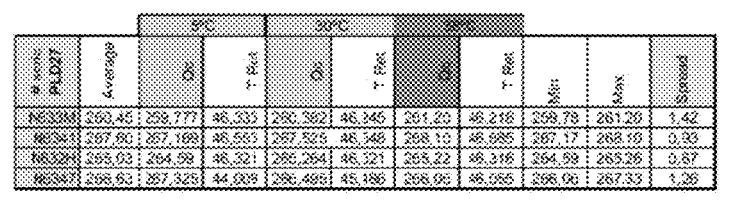

An example of the result of an injection variation measurement test can be seen in FIGS. 17 to 19. FIG. 17 illustrates a graph of the fuel temperature of four different pumps in three different initial pump temperatures. In such conditions, the injection volume output measurements were performed and are illustrated in FIGS. 18 and 19, which show the injection volume output measurement with a maximum spread of 1.42 mm$^3$. This maximum value is within a standard tolerated spread limit for injection deviation. FIG. 19 illustrates a table with the values extracted from the graph of FIG. 18, with the injection volume output (Qc) in mm$^3$/stk and the fuel temperature (TRet) for each test condition (5° C., 30° C. and 38° C.). It also shows an average injection volume output, a minimum injection volume output, a maximum injection volume output and a spread value for each pump.

Although the description above contains some specifications, these should not be construed as limiting the scope of the disclosure but as merely providing illustrations of some of embodiments of this disclosure. Thus, the scope of the disclosure should be determined by the appended claims and their legal equivalents rather than by the examples given.

What is claimed is:

1. A method of testing a unit pump system performance comprising the steps of:
    setting up and initializing a test bench;
    determining if a mechanical stability of a control valve of the unit pump system is achieved by measuring a fuel temperature of the unit pump system; wherein the mechanical stability of the control valve of the unit pump system is achieved when the fuel temperature of the unit pump system matches a target value of temperature for mechanical stability, and
    measuring an injection quantity if the mechanical stability of the control valve of the unit pump system is achieved.

2. The method of claim 1, wherein the step of determining if the mechanical stability of the control valve of the unit pump system is achieved continues to be performed if the mechanical stability is not achieved.

3. A method of testing a unit pump system performance comprising the steps of:
    setting up and initializing a test bench;
    determining if an electrical stability of a control valve of the unit pump system is achieved by measuring an electric current profile of the control valve; wherein the step of measuring the electric current profile of the control valve comprises determining a moment in time a first predetermined electric current value is measured, determining a moment in time a second predetermined electric current value is measured and calculating a time difference between the moments the two predetermined electric current values are measured, and measuring an injection quantity if the electrical stability of the control valve of the unit pump system is achieved.

4. The method of claim 3, wherein the electric current profile is measured by measuring a solenoid resistance of the control valve of the unit pump system.

5. The method of claim 3, wherein the electrical stability of the control valve of the unit pump system is achieved when the time difference between the determined moments of the two predetermined electric current values is lower than a threshold value of time for electrical stability.

6. The method of claim 3, wherein the step of determining if the electrical stability of the control valve of the unit pump system is achieved continues to be performed if the electrical stability is not achieved.

\* \* \* \* \*